United States Patent [19]

McKellar et al.

[11] Patent Number: 5,050,535
[45] Date of Patent: Sep. 24, 1991

[54] BAG FOR CONTAINING LIVE FISH

[76] Inventors: Kelly McKellar; Robert M. Pozzebon, both of 24 Fay Road, S.E., Calgary, Alberta T2H-1H4, Canada

[21] Appl. No.: 390,417
[22] Filed: Aug. 7, 1989
[51] Int. Cl.⁵ .............................................. A01K 63/02
[52] U.S. Cl. ...................................................... 119/3
[58] Field of Search .................. 119/3; 43/55; 383/63, 383/103, 110, 113

[56] References Cited

U.S. PATENT DOCUMENTS 3,403,064  9/1968  Bellamy ........................... 383/113 X
4,310,118  1/1982  Kisida et al. ..................... 383/103 X
4,691,372  9/1987  Van Erden .......................... 383/63

FOREIGN PATENT DOCUMENTS 2193071  2/1988  United Kingdom ..................... 119/3

Primary Examiner—Robert P. Swiatek
Attorney, Agent, or Firm—Terry M. Gernstein

[57] ABSTRACT

A bag for containing live fish includes a multi-layered wall having a semi-permeable membrane mounted therein to pass air into and out of the bag, but which prevents the passage of water into or out of the bag. The wall includes a layer that is opaque to sunlight as well as an insulation layer. A handle and a zip-lock closure are included.

1 Claim, 2 Drawing Sheets

BAG FOR CONTAINING LIVE FISH

TECHNICAL FIELD OF THE INVENTION

The present invention relates to the general art of containers, and to the particular field of special containers and bags.

BACKGROUND OF THE INVENTION

Raising fish is a hobby of ever increasing popularity. The hobby includes raising simple gold fish in a bowl to raising and breeding salt water fish in a complex ecosystem that is carefully controlled. Millions of dollars are spent annually on this hobby.

Since fishes are cold blooded or poikilothermous vertebrates, they are unable to regulate their body temperatures against the prevailing water temperature around them. As a result, their metabolism tends to become sluggish if the water temperature drops, and in the majority of fishes, the blood is at approximately the same temperature as the surrounding water and heat generated by muscular action can be rapidly lost by the animal.

Thus, as is well appreciated by most serious fish collectors, the temperature conditions in which the fish is being kept should be carefully controlled and regulated. Accordingly, there are several designs for heaters, and other such water temperature controlling devices that are suitable for use in an aquarium.

While these devices work quite well in the aquarium environment, the present inventors have found that many fish are damaged or destroyed due to extreme temperature fluctuations occurring in the water during transportation of the fish from the store to the owner's aquarium. This transit time can be anywhere from a few minutes to an hour or more.

The fish is generally removed from the store's aquarium, placed in a bag, transported, and then transferred to the owner's aquarium. Even if the end points of this journey are carefully controlled, the middle thereof, i.e., the transport period, is generally not so controlled. This middle portion of the transfer process can expose the fish to extremes in temperature that are caused by both the differences in temperature of the environment and due to the capturing of energy in the water due to an absorption of sun's rays into the bag.

It is this middle portion of the transfer process that has remained uncontrolled.

While the inventors are aware of many bags that can be used to contain fish, the inventors are not aware of any bag that can control the environment in a manner that is required for the safe transport of fish in a temperature controlled manner.

Accordingly, there is a need for a bag that can be used for containing and transporting live fish in a controlled and safe environment.

OBJECTS OF THE INVENTION

It is a main object of the present invention to provide a bag that can be used for containing and transporting live fish in a controlled and safe environment.

It is another object of the present invention to provide a bag that can be used for containing and transporting live fish in a controlled and safe environment that ensures a constant source of air for the fish.

SUMMARY OF THE INVENTION

These, and other, objects are achieved by a bag that includes a multi-layer wall having a semi-permeable membrane positioned therein. A handle is also mounted on the wall to facilitate the easy carrying of the bag. The wall includes at least one layer that is opaque and the membrane permits the passage of air into and out of the bag, but prevents the passage of water therethrough. As used herein, a semi-permeable membrane is a membrane which permits one species to move freely in either direction therethrough, but is impermeable to another species. In this case, the membrane is permeable to air and is impermeable to liquid, specifically water.

In this manner, the wall of the bag will prevent sunlight from entering the bag and thus heating the water, and will permit air to flow into and out of the bag to further control the temperature within the bag by a convective heat transfer mechanism. The free transfer of air will also benefit the fish stored in the bag. A layer of insulation is also included and acts to further control the temperature of the water in the bag.

BRIEF DESCRIPTION OF THE DRAWING FIGURES

DETAILED DESCRIPTION OF THE PREFERRED EMBODIMENT OF THE INVENTION

Figure 1:
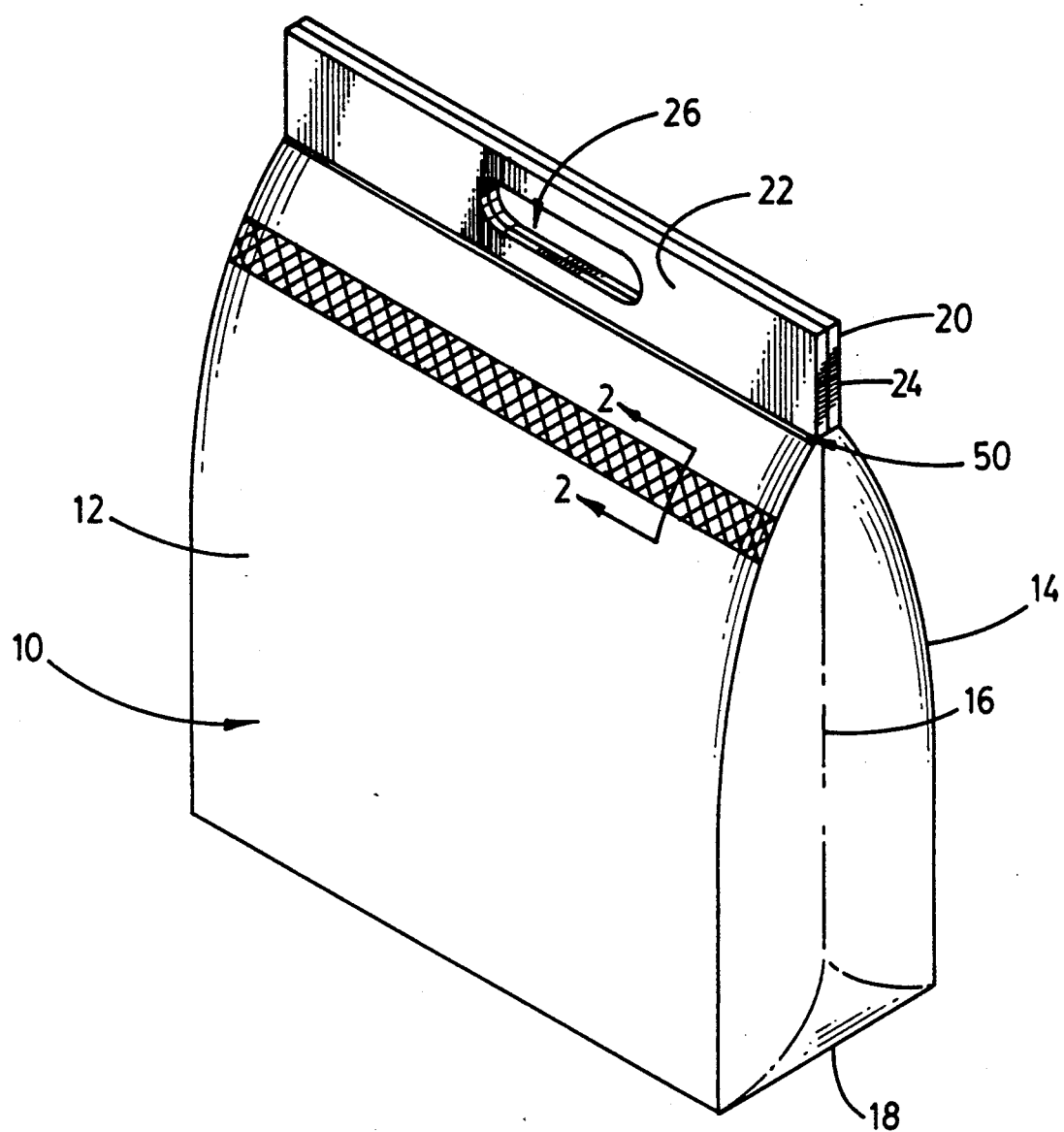
FIG. 1 is a perspective view of a bag embodying the present invention.

Shown in FIG. 1 is a bag 10 that can be used for containing and transporting live fish in a controlled environment that will maintain the temperature of any water contained therein at a constant level whereby the fish need not undergo a severe temperature adjustment during transport from the carefully controlled aquarium in a pet store to a carefully controlled environment of an owner's aquarium.

The bag 10 includes a multi-layer front wall 12 and a multi-layer rear wall 14 that are joined by multi-layer collapsing side walls, such as side wall 16, and by a multi-layer bottom 18. The bag also includes a carrying handle 20 that includes projections and grooves so that two parts 22 and 24 of the handle can be releasably joined together. One of the handle parts is attached to the front wall and the other handle part is attached to the rear wall. A hand-grip 26 is also formed by the handle parts when they are attached together, and when so attached, serve to close the bag 10. The bag will collapse into a planar configuration for storage.

Figure 2:
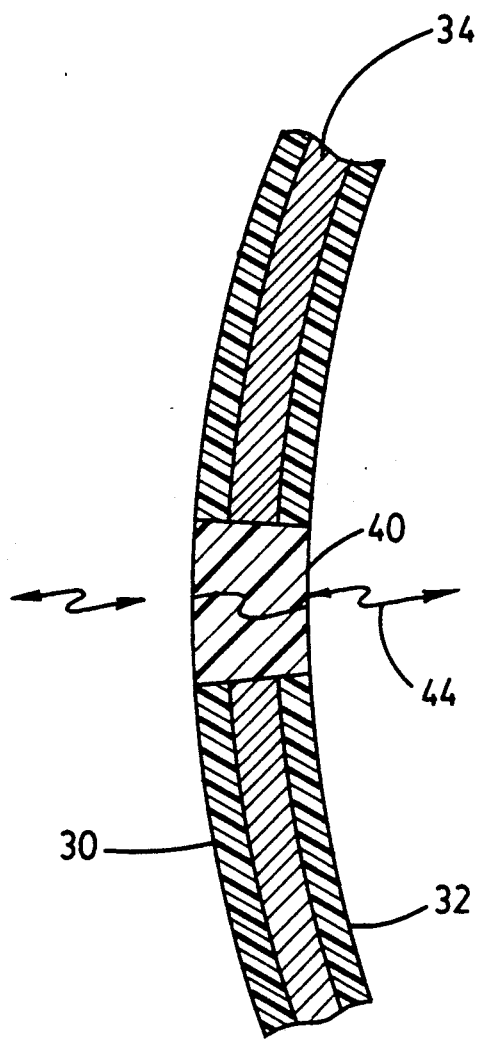
FIG. 2 is a cross-sectional view taken along line 2—2 of FIG. 1 showing the various layers of the bag wall and the semi-permeable membrane that is included in that wall.

As is best shown in FIG. 2, the walls of the bag are multi-layered, and include an outer layer 30, and inner layer 32 and an insulation layer 34 sandwiched between such outer and inner layers. The layers 30 and 32 are plastics type materials, but are not cross hatched for the sake of clearly showing all portions of the wall in FIG. 2. The insulation layer preferably is a styrofoam type material, and adds some structural strength to the bag.

The outer layer 30 is opaque to sunlight so that sunlight will not be permitted to pass into the interior of the bag. As is well known, sunlight passing into a bag such as bag 10 may have a tendency to add energy to that bag which energy may become trapped in the bag due to the thermal characteristics of that bag and thus tend to heat up the interior of the bag. By preventing such sunlight from entering the bag 10, this possibility is effectively eliminated. The opacity of the outer layer also will permit the bag to be decorated in various colors and include various indicia, such as a store logo, instructions or the like as is suitable. The capacity also serves to sooth the fish due to the darkness of the bag interior.

To further control the interior temperature of the bag 10, the bag includes a semi-permeable membrane 40. The membrane 40 permits air to pass freely therethrough into and out of the interior of the bag as is indicated in FIG. 2 by the double-headed arrows, such as arrow 44, yet prevents the passage of water therethrough. A suitable hydrophobic membrane can be selected from standard references such as the Chemical Engineers Standard Handbook, or other such Chemical Engineering texts and references, and suitable membranes are available from companies such as Celenese, duPont and others. Those skilled in the membrane art will be able to make a choice of a suitable membrane based on the teaching and instructions of this disclosure. The free transfer of air into and out of the interior of the bag serves to further control the temperature of the bag interior via a convective heat transfer mechanism and also serves to keep fresh air in the bag.

Referring again to FIG. 1, the bag 10 also is seen to include a lock 50 that secures the front wall to the rear wall. The lock 50 includes a tongue element on the front wall and a groove element on the rear wall, with both elements being flexible so the tongue element can be inserted and removed from the groove element in a "zip-locking" type fashion.

It is understood that while certain forms of the present invention have been illustrated and described herein, it is not to be limited to the specific forms or arrangements of parts described and shown.

We claim:
1. A bag for containing and transporting live fish in a controlled temperature environment comprising:
   (A) a multilayer bag wall that includes
      (1) a multilayer front wall having an opaque outer layer having an outer surface, an inner layer having an inner surface and insulation sandwiched between said front wall inner layer and outer layer, a top edge, a bottom edge, and two side edges,
      (2) a gas permeable, liquid impermeable membrane in said bag front wall, said membrane being located closely adjacent to said front wall top edge and extending completely across said bag front wall from one of said side edges to the other of said two side edges, said membrane extending from said front wall outer surface to said front wall inner surface, said insulation stopping adjacent to said membrane and said membrane having none of said insulation therein,
      (3) a lock element on said front wall top edge, and
      (4) a first handle element attached to said front wall top edge;
   (B) a multilayer bottom wall having a front edge attached to said front wall bottom edge, a rear edge, two side edges each located adjacent to one of said front wall side edges, said bottom wall having an opaque outer layer having an outer surface, an inner layer having an inner surface and insulation sandwiched between said bottom wall inner layer and outer layer;
   (C) two multilayer side walls, each side wall having an opaque outer layer having an outer surface, an inner layer having an inner surface and insulation sandwiched between each side wall inner layer and outer layer, a top edge connected to said front wall top edge, a bottom edge connected to said one of said bottom wall side edges, and two side edges with one of said side wall side edges being connected to one of said front wall side edges, each sidewall further including a foldline extending from said side wall top edge to said side wall bottom edge and dividing said side wall into two portions that fold on top of each other;
   (D) a multilayer rear wall having an opaque outer layer having an outer surface, an inner layer having an inner surface and insulation sandwiched between said rear wall inner and outer layers, a top edge, a bottom edge connected to said bottom wall rear edge, and two side edges each connected to one of said side wall side edges, said rear wall further including a rear lock element on said rear wall top edge, and a second handle element attached to said rear wall top edge, said rear lock element cooperating with said front wall lock element to lock said rear wall to said front wall and said rear wall handle element cooperating with said front wall handle element to form a handle.

* * * * *